US000001393H

United States Statutory Invention Registration [19]

[11] Reg. Number: H1393

Buske

[43] Published: Jan. 3, 1995

[54] DIPHENYL ETHER AND BENZOPHENONE COMPOSITIONS

[75] Inventor: Gary R. Buske, Midland, Mich.

[73] Assignee: The Dow Chemical Company, Midland, Mich.

[21] Appl. No.: 770,498

[22] Filed: Oct. 3, 1991

[51] Int. Cl.[6] ..... C09K 5/00; H01B 3/20

[52] U.S. Cl. ..... 252/73; 252/52 R; 252/578

[58] Field of Search ..... 252/73, 52 R, 578

[56] References Cited

U.S. PATENT DOCUMENTS 1,874,258 8/1932 Dow ..... 252/68
1,972,847 9/1934 Levine et al. ..... 252/578
3,009,881 11/1961 Burr et al. ..... 252/73

*Primary Examiner*—Shean Wu

[57] ABSTRACT

A functional fluid composition comprises a homogeneous mixture of diphenyl ether and benzophenone and at least one additional component selected from the group consisting of dibenzofuran and naphthalene. In a more specific embodiment, a functional fluid composition comprises a homogeneous mixture of diphenyl ether employed in an amount from about 5 to about 80 weight percent, benzophenone employed in an amount from about 5 to about 50 weight percent, and at least one additional component selected from the group consisting of dibenzofuran and naphthalene employed in an amount from about 5 to about 25 weight percent, the diphenyl ether, the benzophenone, and the at least one additional functional fluid composition is thermally stable up to at least about 650° F. and has a freezing point of less than about 54° F.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIPHENYL ETHER AND BENZOPHENONE COMPOSITIONS

TECHNICAL FIELD

This invention relates generally to functional fluids, such as heat-transfer fluids, lubricants, hydraulic fluids, and the like. More specifically this invention relates to functional fluids which contain diphenyl ether, benzophenone, and at least one additional component selected from dibenzofuran and naphthalene.

BACKGROUND OF THE INVENTION

A currently popular heat-transfer fluid consists of a eutectic mixture of diphenyl ether and biphenyl. The diphenyl ether/biphenyl eutectic mixture has good thermal stability up to 750° F. and, therefore, has a maximum recommended use temperature of 750° F. Unfortunately, the fluid freezes at about 54° F. This high freezing point requires users to heat-trace their systems in order to start up or shut down anywhere the temperature may drop below the 54° F. The need to heat-trace results in increased capital, maintenance, and operating expenses. There exists other heat-transfer fluids which have lower freezing points (also referred to as "minimum use temperatures") but they do not have high maximum recommended use temperatures. Therefore, there is a need for an improved heat-transfer fluid having a low freezing point and a relatively high maximum recommended use temperature.

Additionally, there exist needs for improved lubricants and hydraulic fluids. The demands placed on these materials continue to undergo significant changes. Lubricants and hydraulic fluids for future automotive and aeronautic applications will have requirements different from those currently in use. For example, it is anticipated that engines will operate at temperatures exceeding 480° F. and will be constructed using materials different from those currently in use. Thus, what are needed are new compositions useful as lubricants or hydraulic fluids that are stable at the high use temperature while possessing the other properties required of these materials.

Materials such as heat-transfer fluids, lubricants, and hydraulic fluids may be considered "functional fluids" because of their usefulness in mechanical operations. Examples of previous attempts of preparing such functional fluids are described in the following patents.

U.S. Pat. No. 4,622,160 issued to Buske et al. on Nov. 11, 1986, discloses heat transfer fluids which are made by mixing methyl and/or ethyl biphenyls with diethylbenzenes. The heat transfer fluids may contain one or more extenders, which extenders include diphenyl oxide and/or biphenyl.

U.S. Pat. No. 4,054,533 issued to Watson on Oct. 18, 1977, discloses heat transfer fluids consisting essentially of about, by weight: (a) 20 to about 40 percent of diphenyl ether, (b) 40 to about 60 percent of a 2-biphenylyl phenyl ether and 4-biphenylyl phenyl ether mixture, and (c) 12 to about 25 percent of a polyphenylphenol mixture. Minor amounts, typically less than about 7 weight percent, of various impurities may be present, which impurities include phenylnaphthalene, methylphenylnaphthalene and the like. U.S. Pat. No. 3,966,626 issued to Jackson et al. on Jun. 29, 1976, discloses heat transfer agents containing at least about 20 volume percent diphenyl oxide and at least 20 volume percent biphenylyl phenyl ether, polyphenyl ether or mixtures thereof.

U.S. Pat. No.3,931,028 issued to Jackson et al. on Jan. 6, 1976, discloses that a well-known heat transfer fluid consisting essentially of the eutectic mixture of diphenyl oxide and biphenyl is improved by the addition of monomethyl or monoethylbiphenyl.

U.S. Pat. No. 3,907,696 issued to Jackson et al. on Sep. 23, 1975, discloses heat transfer agents containing at least three components consisting of by volume 5 to 90 percent diphenyl oxide, 5 to 50 percent biphenyl and 5 to 90 percent polyphenyl ether having 3 or 4 aromatic nuclei, alkylated biphenyl or diphenyl oxide having 1 to 4 methyl or ethyl substituents, ethylbenzene oil and mixtures thereof.

U.S. Pat. No. 3,888,777 issued to Jackson et al. on Jun. 10, 1975, discloses a three-component heat transfer agent containing 5 to 90 percent diphenyl oxide, 5 to 50 percent biphenyl and 5 to 90 percent biphenylyl phenyl ether.

U.S. Pat. No. 3,243,380 issued to Conn on Mar. 29, 1966, discloses a method of decontaminating an aromatic hydrocarbon liquid moderator-coolant. For evaluation purposes, liquid triphenyl products were used with determined amounts of dibenzothiophene admixed.

U.S. Pat. No. 3,113,090 issued to Ort et al. on Dec. 3, 1963, discloses a composition for cooling neutronic reactor comprising polyphenyl and anthracene. Polyphenyl is defined in the patent to include biphenyl, terphenyls, alkylation products thereof and mixtures thereof.

U.S. Pat. No. 2,883,331 issued to Bolt et al. on Apr. 21, 1959, discloses inhibited reactor coolants comprising certain polynuclear aromatic hydrocarbons, certain aryl selenium and sulfur compounds. The certain aryl selenium and sulfur compounds contain at least two phenyl rings and at least one sulfur or selenium atom or both, the compounds being substantially free of elements other than C, H, S and Se. Suitable polynuclear aromatic hydrocarbons include biphenyl and naphthalene.

U.S. Pat. No. 2,033,702 issued to Grebe et al. on Mar. 10, 1936, discloses a heat transfer agent comprising a mixture of polynuclear aromatic hydrocarbons higher than diphenyl which is formed through the condensation between benzene and/or diphenyl in the manufacture of diphenyl by pyrolysis of benzene. The material is obtained as a residue after distilling off unreacted benzene and diphenyl product from the reacted mixture. The patent describes that the exact composition of the residual mixture is not known, but it contains a considerable proportion of triphenyl, tetraphenyls, etc.

U.S. Pat. No. 1,972,847 issued to Levine et al. on Sep. 4, 1934, discloses a stable heat transfer medium comprising diphenyl oxide, naphthalene and diphenyl.

U.S. Pat. No. 1,882,809 issued to Grebe on Oct. 18, 1932, discloses a heat transfer fluid having a hiqh boiling point and a low freezing point comprising diphenyloxide and diphenyl. Grebe mentions that after using the fluid continuously for some time, a gradual decomposition will occur wherein products of higher and lower boiling points will be formed, and that the formation of such decomposition products still further lowers the final freezing point of the mixture.

U.S. Pat. No. 1,874,258 issued to Dow on Aug. 30, 1932, discloses a heating fluid which consists of diphenyl oxide, diphenylene oxide (also known as dibenzofuran), and, optionally, diphenyl or naphthalene.

French Patent No. 960,087 issued to the Standard-Thomson Corporation of the United States on Oct. 17, 1949, discloses liquids for filling thermostatic devices which include a mixture which is essentially the eutectic mixture of diphenyl ether with two or three of the following compounds: diphenyl, metaterphenyl, orthoterphenyl, and benzophenone.

It is, therefore, an object of the present invention to provide a functional fluid composition (a) which is useful as either a heat-transfer fluid, a lubricant, or a hydraulic fluid, and the like, (b) which has a low freezing point and a high maximum recommended use temperature, (c) which contains components which are mutually soluble and capable of preparing homogeneous mixtures, (d) wherein the components have relatively close boiling points for easier recovery and purification by distillation, and (d) which are made from readily available materials.

SUMMARY OF THE INVENTION

In accordance with a preferred embodiment of the invention, these and other objects and advantages are addressed as follows.

A functional fluid composition is disclosed which comprises a homogeneous mixture of diphenyl ether and benzophenone and at least one additional component selected from the group consisting of dibenzofuran and naphthalene. In a more specific embodiment, a functional fluid composition is disclosed which comprises a homogeneous mixture of diphenyl ether employed in an 1 amount from about 5 to about 80 weight percent, benzophenone employed in an amount from about 5 to about 50 weight percent, and at least one additional component selected from the group consisting of dibenzofuran and naphthalene employed in an amount from about 5 to about and the at least one additional component being present in such quantities that the functional fluid composition is thermally stable up to at least about 650° F. and has a freezing point of less than about 54° F.

DETAILED DESCRIPTION OF THE INVENTION

The invention concerns a functional fluid composition which entails a homogeneous mixture of diphenyl ether and benzophenone and at least one additional component selected from dibenzofuran and naphthalene. Each of the terms "benzophenone", "dibenzofuran", and "naphthalene" are meant to include both the unsubstituted compounds and the compounds substituted with benzoyl, phenyl, and phenoxy radicals. Preferably, the diphenyl ether, the benzophenone, and the additional component are present in the homogeneous mixture in such proportions that the functional fluid composition has a freezing point of less than about 54° F. and is thermally stable up to at least about 650° F.

The term "freezing point" is used to mean the highest temperature at which solid can still appear in the fluid. In the functional fluid art, this is sometimes referred to as the "crystal point", which is the highest temperature at which solid and liquid can exist in thermodynamic equilibrium.

With respect to thermal stability, the maximum temperature at which a material is considered thermally stable is considered to be the highest temperature at which the fluid experiences less than about 5 weight percent degradation to undesirable compounds per week. Ultimately, however, the use and the end-use application will determine how much degradation is acceptable at any given temperature. A detailed description of how to measure degradation is provided in the Examples which follow.

Typically, the levels of the components of the homogeneous mixture are such that diphenyl ether is employed in an amount from about 5 to about 80 weight percent, the benzophenone is employed in an amount from about 5 to about 50 weight percent, and the additional component, that is, dibenzofuran and/or naphthalene, are each individually employed from about 5 to about 25 weight percent. By the term "each individually employed from about 5 to a'out 25 weight percent", it is meant that both dibenzofuran and naphthalene may be employed in the same composition and may each be used from about 5 to about 25 weight percent of the functional fluid composition.

More preferred functional fluid compositions are prepared when the levels of the components are such that diphenyl ether is employed in an amount from about 40 to about 60 weight percent, the benzophenone is employed in an amount from about 20 to about 35 weight percent, and the additional component, the dibenzofuran and/or naphthalene, are each individually employed from about 5 to about 15 weight percent.

Optionally, biphenyl may be added to the compositions of this invention. Biphenyl is favorably used in an amount from greater than 0 to about 30 weight percent of the functional fluid composition. Preferably, biphenyl is used from about 10 to about 20 weight percent of the functional fluid composition.

The eutectic compositions, or those that are near the eutectic compositions, are the most preferred compositions of this invention. The levels of the components in the eutectic or near eutectic compositions depend upon which components are used. The following describes the most preferred compositions, which are also reflected in the Examples provided hereinbelow.

One preferred composition contains (a) diphenyl ether employed in an amount from about 50 to about 60 weight percent, (b) benzophenone employed in an amount from about 28 to about 38 weight percent, and (c) naphthalene employed in an amount from about 7 to about 17 weight percent.

A second preferred composition Contains (a) diphenyl ether employed in an amount from about 49 to about 59 weight percent, (b) benzophenone employed in an amount from about 27 to about 37 weight percent, and (c) dibenzofuran employed in an amount from about 9 to about 19 weight percent.

A third preferred composition contains (a) diphenyl ether employed in an amount from about 42 to about 52 weight percent, (b) benzophenone employed in an amount from about 23 to about 33 weight percent, (c) naphthalene employed in an amount from about 5 to about 15 weight percent, and (d) biphenyl employed in an amount from about 11 to about 21 weight percent.

A fourth preferred composition contains (a) diphenyl ether employed in an amount from about 41 to about 51 weight percent, (b) benzophenone employed in an amount from about 22 to about 32 weight percent, (c) dibenzofuran employed in an amount from about 6 to about 16 weight percent, and (d) biphenyl employed in an amount from about 11 to about 21 weight percent.

A fifth preferred composition contains (a) diphenyl ether employed in an amount from about 44 to about 55 weight percent, (b) benzophenone employed in an amount from about 24 to about 34 weight percent, (c)

dibenzofuran employed in an amount from about 7 to about 17 weight percent, and (d) naphthalene employed in an amount from about 5 to about 15 weight percent.

A sixth and the most preferred composition contains (a) diphenyl ether employed in an amount from about 37 to about 47 weight percent, (b) benzophenone employed in an amount from about 20 to about 30 weight percent, (c) dibenzofuran employed in an amount from about 5 to about 15 weight percent, (d) naphthalene employed in an amount from about 4 to about 14 weight percent, and (e) biphenyl employed in an amount from about 9 to about 19 weight percent.

Optionally, additional components, such as anthracene, phenanthrene, o-, m-, and p-benzoylbiphenyl, o-, m-, and p-benzoylphenyl phenyl ether, 1- and 2-benzoylnaphthalene, and fluorene may be added to the functional fluid compositions of this invention. Benzoyl, phenyl-, and phenoxy-substituted naphthalenes, dibenzofurans and benzophenones are also useful additives for the compositions.

The compositions of the present invention may also contain impurities that normally occur in the production and isolation of the individual components. Some of the impurities that may be expected include 1-methylnaphthalene, 2-methylnaphthalene, fluorene, anthracene, phenanthrene, phenol, 2-methylbiphenyl, 3-methylbiphenyl, 4-methylbiphenyl, 2-methylphenyl phenyl ether, 3-methylphenyl phenyl ether, 4-methylphenyl phenyl ether, and diphenylmethane. Generally, impurities should be present in an amount less than about 5 weight percent based on the weight of the functional fluid composition, preferably, in an amount less than about 1 weight percent.

Advantageously, the components of the compositions of this invention have boiling points relatively close which makes recovery and purification by distillation easier. The boiling point of diphenyl ether is 258.3° C.; of benzophenone, 305.9° C., of dibenzofuran, 287°–288° C.; of naphthalene, 218.0° C.; and of biphenyl, 256.1° C. Therefore, the boiling points of the components are generally within a 100° C. range.

The compositions of this invention normally have boiling points of greater than about 200° C. The high boiling points are beneficial in that high vapor pressures are avoided which require high-pressure processing equipment.

To form the compositions of this invention, the components may be mixed in any manner and in any order desired. For examples of suitable methods of mixing: (a) the components may first be melted before mixing, (b) one component may be melted and the other components added as solids, or (c) the components may be mixed as solids. The solid mixture or a slurry of solid components in liquid may be heated to accelerate mixing and dissolution.

The compositions of this invention may be optimized or formulated to be the precise eutectic mixture. One way to optimize is to 1) freeze a sample of a composition which is close to what is believed to be the eutectic composition, 2) thaw the sample and draw off the portion which melts first, 3) analyze the composition of the drawn-off portion, 4) prepare a new sample having the composition of the drawn-off portion, 5) freeze the new sample and 6) repeat steps 2–5 until the composition of the sample matches the drawn-off portion. The eutectic mixture typically melts over a 1°–2° C. range.

Thus, there is provided in accordance with the present invention, a functional fluid composition (a) which is useful as either a heat-transfer fluid, a lubricant, or a hydraulic fluid, and the like, (b) which has a low freezing point and a high maximum recommended use temperature, (c) which contains components which are mutually soluble and capable of preparing homogeneous mixtures, (d) wherein the components have relatively close boiling points for easier recovery and purification by distillation, and (d) which are made from readily available materials.

The following examples are illustrative only and should not be construed as limiting the invention which is properly delineated in the appended claims.

EXAMPLES

The compositions in the following examples are believed to be close to the eutectic compositions for the components used as it was found that the compositions melted over a relatively narrow temperature range. However, the formulations may be further optimized to arrive at a composition having the minimum freezing point for the given components.

The freezing points of the various compositions prepared in the examples were measured by starting with a sample of the given composition cooled to a temperature where it was completely frozen. Seed crystals of all the components present in the composition were added to ensure complete freezing. The temperature of the frozen sample was then increased in such a manner that it was believed to maintain the sample in thermal and solid/liquid equilibrium. To increase the temperature, the sample was placed in a constant-temperature freezer or bath, and the temperature was raised 1° or 2° F. every few days. During the period of increasing the temperature, the sample was agitated by periodic shaking.

EXAMPLES 1–6

The functional fluids having the compositions given in Table 1 were prepared. The functional fluids prepared were colorless to pale yellow clear liquids at room temperature. The freezing point for each composition was measured and is also provided in Table 1.

TABLE 1

| | Weight Percent in Composition | | | | | FP[f] |
|---|---|---|---|---|---|---|
| Example | DPE[a] | BP[b] | Naph[c] | DBF[d] | BZP[e] | °F. |
| 1 | 55.19 | 0 | 11.95 | 0 | 32.86 | 38 |
| 2 | 54.03 | 0 | 0 | 13.73 | 32.24 | 37 |
| 3 | 46.71 | 15.76 | 9.91 | 0 | 27.62 | 27 |
| 4 | 45.99 | 15.50 | 0 | 11.34 | 27.17 | 25 |
| 5 | 48.68 | 0 | 10.39 | 12.09 | 28.84 | 28 |
| 6 | 42.10 | 14.08 | 8.83 | 10.20 | 24.79 | 17 |

[a]diphenyl ether
[b]biphenyl
[c]naphthalene
[d]dibenzofuran
[e]benzophenone
[f]freezing point

EXAMPLE 7

The components of the compositions of this invention can degrade somewhat to other compounds, especially when maintained at very high temperatures. In general, a mixture of components is said to degrade no faster than the least stable component in the mixture. Therefore, to determine the thermal stability of the compositions of this invention, degradation rates of the individual components of the compositions were measured at 750° F. To measure the degradation rate of each component, several glass ampoules measuring about 8 mm o.d. by about 25 cm in length were each filled with about three grams of the component under investigation. The ampoules were attached to a vacuum line, and samples were cooled to −78° C. by immersion into an insulated vessel containing dry ice and methylene chloride. The ampoules were then evacuated to less than 70 millitorr and sealed with a torch. The sealed ampoules were each placed in a ½" o.d. stainless steel tube. About three grams of the heater-transfer fluid, "DOWTHERM A", (available from the Dow Chemical Company, Midland, Mich., owner of the trademark "DOWTHERM A") were placed in each stainless steel tube and the remaining end of the stainless steel tubes were capped closed. The filled stainless steel tubes were then placed in a circulating-air oven which was heated to the 750° F. Ampoules were periodically removed and their contents analyzed by capillary gas chromatography. The analysis was corrected to take into account the amount of material actually recovered from the ampoule. The corrected recovered starting material values were plotted versus time and a linear least squares regression analysis was done to obtain the degradation rates.

Table 2 provides the degradation rates per week of the individual components of the present invention measured at 750° F. If the degradation rate of a mixture is desired, the same procedure described above should be followed, except that the starting composition of the fluid needs to be determined before heating.

TABLE 2

| Compound | Degradation Rate at 750° F. (percent/week) |
|---|---|
| Diphenyl ether | 1.15 |
| Biphenyl | 1.05 |
| Naphthalene | 0.88 |
| Dibenzofuran | 2.25 |
| Benzophenone | 2.7* |

*The degradation rate of benzophenone was determined at 700° F.

While my invention has been describe in terms of specific embodiments, it must be appreciated that other embodiments could readily be adapted by one skilled in the art. Accordingly, the scope of my invention is to be limited only by the following claims.

What is claimed is:

1. A functional fluid composition, comprising a homogeneous mixture of from about 5 to about 80 weight percent diphenyl ether and from about 5 to about 50 weight percent benzophenone and from about 5 to about 25 weight percent of at least one additional component selected from the group consisting of dibenzofuran and naphthalene.

2. The functional fluid composition of claim 1, wherein the diphenyl ether, the benzophenone, and the at least one additional component are in proportions such that the functional fluid composition is thermally stable up to at least about 650° F.

3. The functional fluid composition of claim 1, wherein the diphenyl ether, the benzophenone, and the at least one additional component are in proportions such that the functional fluid composition has a freezing point of less than about 54° F.

4. The functional fluid composition of claim 1, further comprising biphenyl employed in an amount from greater than 0 to about 30 weight percent.

5. The functional fluid composition of claim 1, wherein the diphenyl ether is employed in an amount from about 40 to about 60 weight percent, the benzophenone is employed in an amount from about 20 to about 35 weight percent, and the at least one additional component is employed in an amount from about 5 to about 15 weight percent.

6. The functional fluid composition of claim 5, wherein the at least one additional component includes a combination of both dibenzofuran and naphthalene individually employed in amounts from about 5 to about 15 weight percent.

7. The functional fluid composition of claim 6, further comprising biphenyl employed in an amount from about 10 to about 20 weight percent.

8. A functional fluid composition, comprising a homogeneous mixture of diphenyl ether employed in an amount from about 5 to about 80 weight percent, benzophenone employed in an amount from about 5 to about 50 weight percent, and the at least one additional component selected from the group consisting of dibenzofuran and naphthalene employed in an amount from about 5 to about 25 weight percent, the diphenyl ether, the benzophenone, and the at least one additional component being present in such quantities that the functional fluid composition is thermally stable up to at least about 650° F. and has a freezing point of less than about 54° F.

9. The functional fluid composition of claim 8, further comprising biphenyl employed in an amount from greater than 0 to about 30 weight percent.

10. The functional fluid composition of claim 8, wherein the at least one additional component includes a combination of dibenzofuran and naphthalene individually employed in amounts from about 5 to about 15 weight percent.

11. The functional fluid composition of claim 10, further comprising biphenyl employed in an amount from about 10 to about 20 weight percent.

12. The functional fluid composition of claim 1, wherein the homogeneous mixture contains:

(a) diphenyl ether employed in an amount from about 50 to about 60 weight percent;
(b) benzophenone employed in an amount from about 28 to about 38 weight percent; and
(c) naphthalene employed in an amount from about 7 to about 17 weight percent.

13. The functional fluid composition of claim 1, wherein the homogeneous mixture contains:

(a) diphenyl ether employed in an amount from about 49 to about 59 weight percent;
(b) benzophenone employed in an amount from about 27 to about 37 weight percent; and
(c) dibenzofuran employed in an amount from about 9 to about 19 weight percent.

14. The functional fluid composition, of claim 1, wherein the homogeneous mixture contains:

(a) diphenyl ether employed in an amount from about 42 to about 52 weight percent;
(b) benzophenone employed in an amount from about 23 to about 33 weight percent;
(c) naphthalene employed in an amount from about 5 to about 15 weight percent; and
(d) biphenyl employed in an amount from about 11 to about 21 weight percent.

15. The functional fluid composition, of claim 1, wherein the homogeneous mixture contains:

(a) diphenyl ether employed in an amount from about 41 to about 51 weight percent;
(b) benzophenone employed in an amount from about 22 to about 32 weight percent;

(c) dibenzofuran employed in an amount from about 6 to about 16 weight percent; and (d) biphenyl employed in an amount from about 11 to about 21 weight percent.

16. The functional fluid composition, of claim 1, wherein the homogeneous mixture contains:

(a) diphenyl ether employed in an amount from about 44 to about 55 weight percent;

(b) benzophenone employed in an amount from about 24 to about 34 weight percent;

(c) dibenzofuran employed in an amount from about 7 to about 17 weight percent; and (d) naphthalene employed in an amount from about 5 to about 15 weight percent.

17. The functional fluid composition, of claim 1, wherein the homogeneous mixture contains:

(a) diphenyl ether employed in an amount from about 37 to about 47 weight percent;

(b) benzophenone employed in an amount from about 20 to about 30 weight percent;

(c) dibenzofuran employed in an amount from about 5 to about 15 weight percent;

(d) naphthalene employed in an amount from about 4 to about 14 weight percent; and (e) biphenyl employed in an amount from about 9 to about 19 weight percent.

* * * * *